June 16, 1964     A. BASHOVER ETAL     3,137,036
METHOD AND APPARATUS FOR MAKING PLASTIC SLIDE FASTENERS
Filed July 17, 1961     6 Sheets-Sheet 1

INVENTORS.
ALBERT BASHOVER
MICHAEL SAMBERG
ATTORNEYS

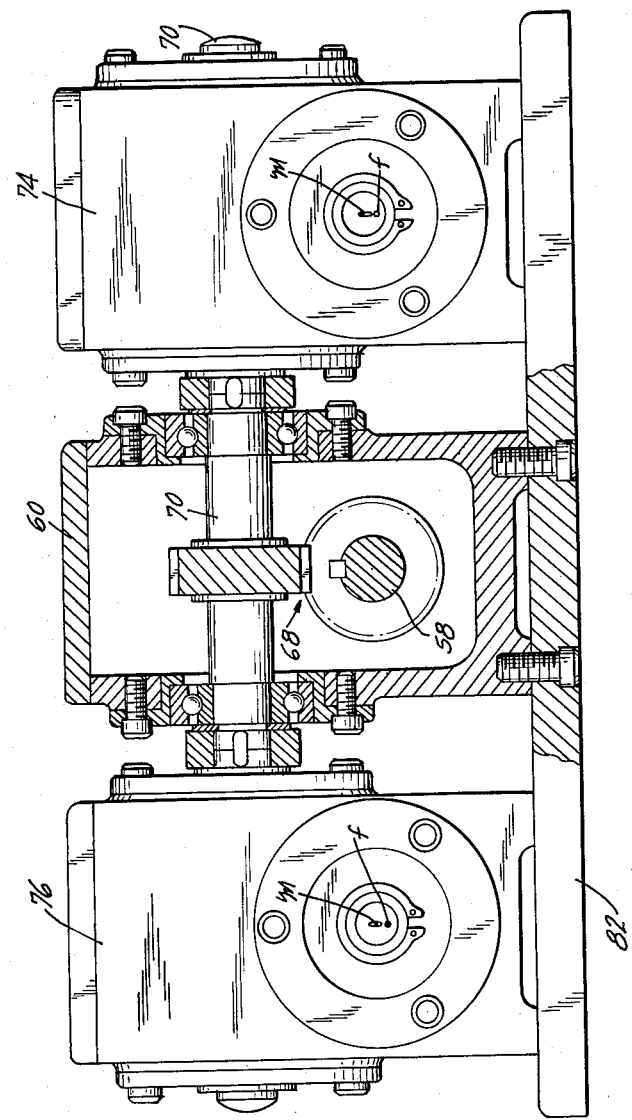

June 16, 1964  A. BASHOVER ETAL  3,137,036
METHOD AND APPARATUS FOR MAKING PLASTIC SLIDE FASTENERS
Filed July 17, 1961  6 Sheets-Sheet 3
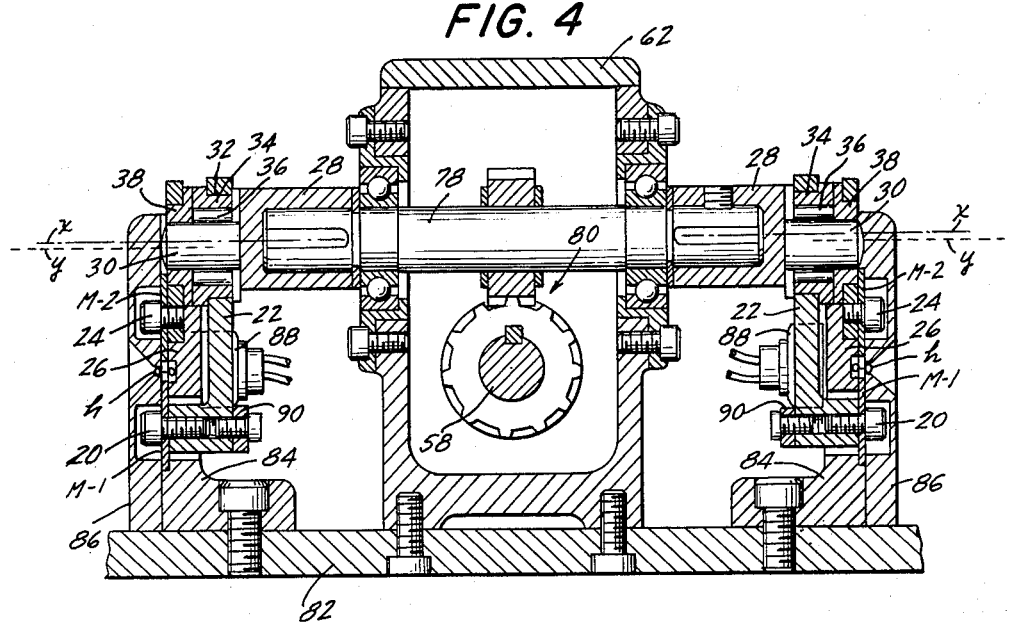
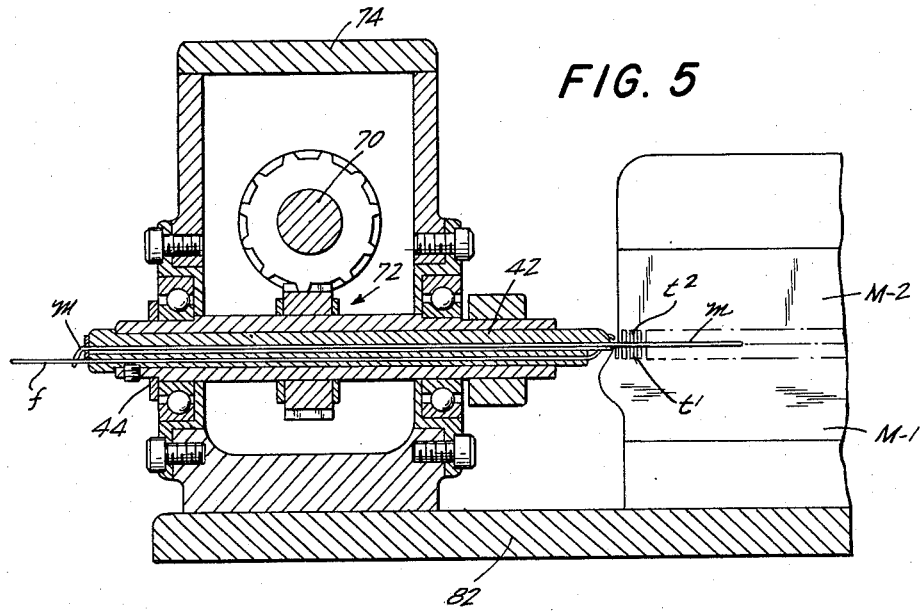
INVENTORS
ALBERT BASHOVER
MICHAEL SAMBERG
BY James & Franklin
ATTORNEYS

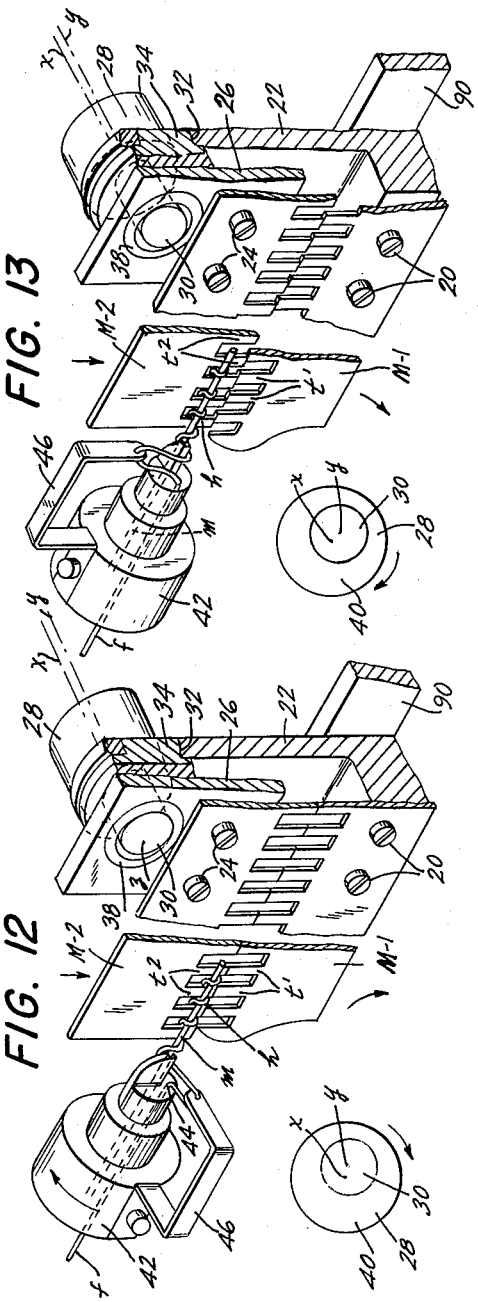
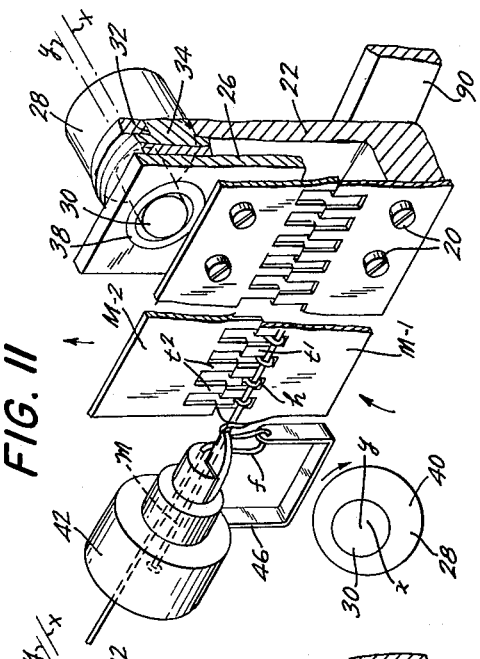
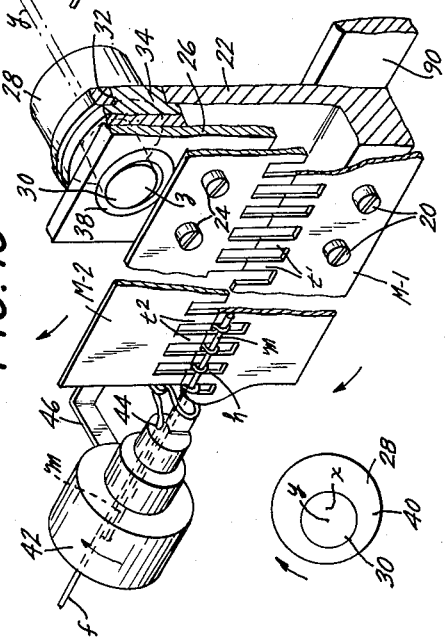
INVENTORS
ALBERT BASHOVER
MICHAEL SAMBERG
BY James Franklin
ATTORNEYS June 16, 1964   A. BASHOVER ET AL   3,137,036
METHOD AND APPARATUS FOR MAKING PLASTIC SLIDE FASTENERS
Filed July 17, 1961   6 Sheets-Sheet 6
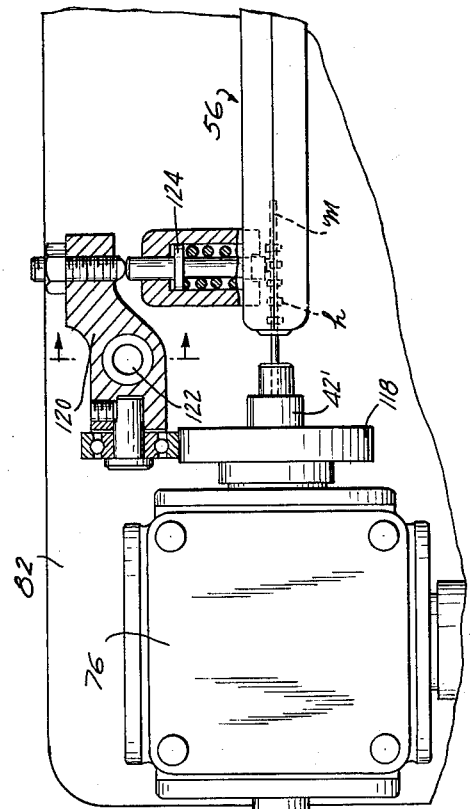
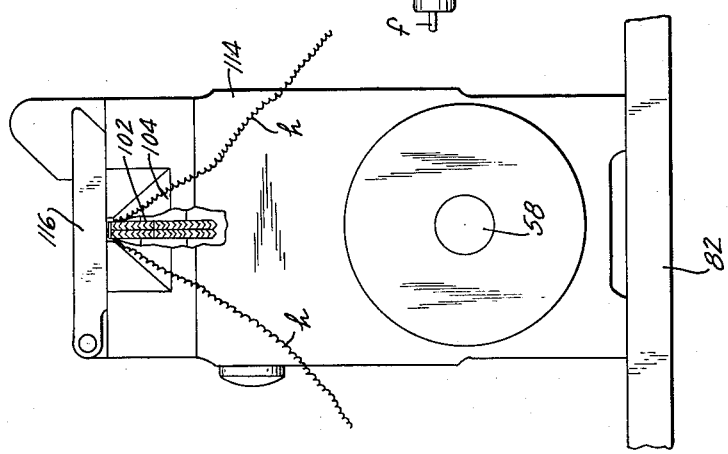
INVENTORS
ALBERT BASHOVER
MICHAEL SAMBERG
BY
James & Franklin
ATTORNEYS United States Patent Office 3,137,036
Patented June 16, 1964

3,137,036
METHOD AND APPARATUS FOR MAKING PLASTIC SLIDE FASTENERS
Albert Bashover and Michael Samberg, Livingston, N.J., assignors to Conmar Products Corporation, Newark, N.J., a corporation of New Jersey
Filed July 17, 1961, Ser. No. 124,480
16 Claims. (Cl. 18—19)

This invention relates to a method and apparatus for making plastic slide fasteners and relates more particularly to the manufacture of helical slide fasteners from plastic filaments.

The prime object of the present invention is to provide an improved method and apparatus for continuously and rapidly producing from a mono-filament thermoplastic such as a polyamide material, a helical slide fastener, the successive windings of which are made to comprise the individual headed elements of the slide fastener.

To the accomplishment of this object and such other objects as may hereinafter appear the present invention relates to the method and apparatus as sought to be defined in the appended claims taken together with the following specification and the accompanying drawings, in which:

FIG. 3 is an enlarged view of the same taken in cross-section in the plane of the line 3—3 of FIG. 1;

FIG. 4 is a similarly enlarged view taken in cross-section in the plane of the line 4—4 of FIG. 1;

FIG. 5 is a view of a portion thereof taken in cross-section in the plane of the line 5—5 of FIG. 1;

FIG. 6 is a view of a portion thereof taken in cross-section in the plane of the line 6—6 of FIG. 1;

FIGS. 10, 11, 12 and 13 are explanatory views showing the sequential steps of the method and the sequential operation of machine parts, all shown to an enlarged scale with reference to that depicted in FIG. 1 of the drawings, for forming the helical slide fasteners;

FIG. 15 is a front elevational view of the part of the apparatus shown in FIG. 6 of the drawings; and FIG. 16 is a view of a modification of the mechanism for forming the heads on the successive windings of the formed helical slide fastener.

Figure 1:
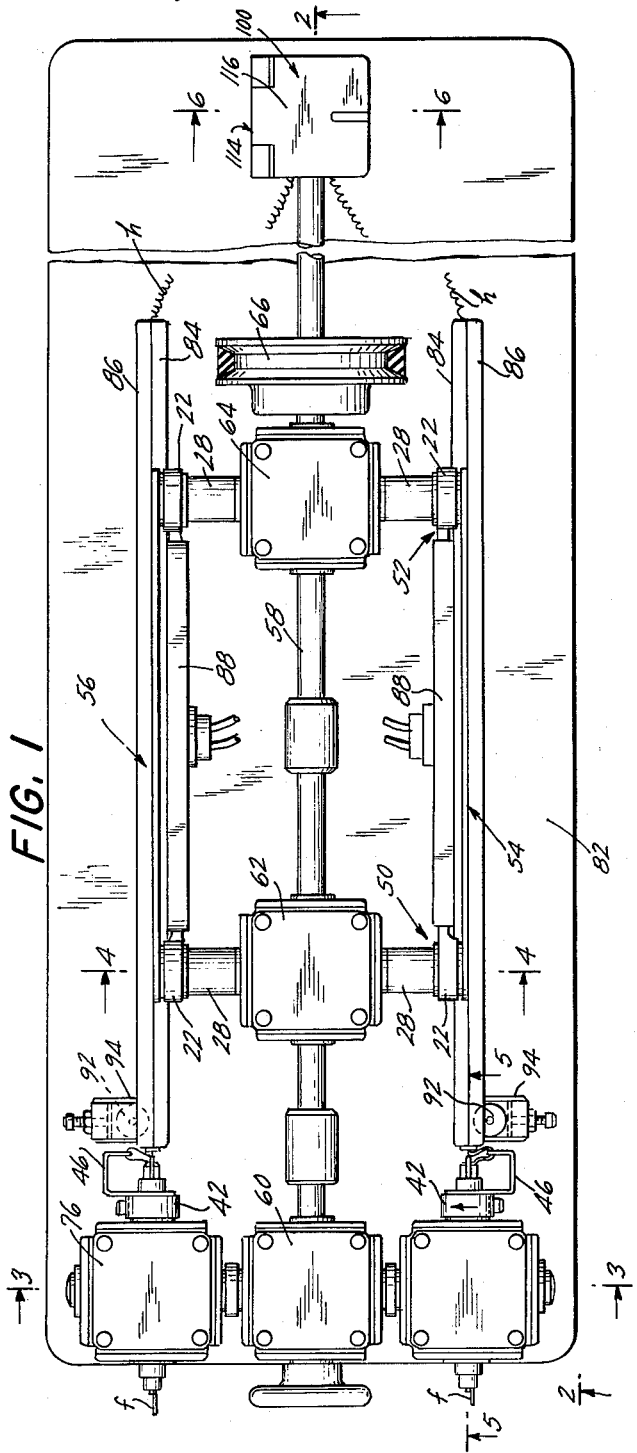
FIG. 1 is a top plan view of the apparatus for making plastic slide fasteners of the present invention.

Referring now more in detail to the drawings and having reference first to FIGS. 10 to 13 which best depict the essential steps of the method and the operated parts of the apparatus of the invention, the method of making a slide fastener in accordance with the principles of the present invention comprises winding a plastic mono-filament $f$ about a thin mandrel $m$ to form the windings of a helix $h$, engaging the individual windings of the helix between the successive teeth of two oppositely facing toothed members M–1 and M–2, the teeth $t'$ of the member M–1 as well as the teeth $t^2$ of the member M–2 being spaced to define the pitch of the windings of the helix $h$, as clearly shown in these figures, and advancing the helix by transferring the helix windings in succession and alternatingly from one toothed member to the other and by longitudinally moving one of the toothed members relatively to the other the distance of the pitch of a winding.

In the preferred method the feeding and advancing of the helix is accomplished by fixing the position of the mandrel $m$ and by moving the toothed members M–1 and M–2 relatively to the mandrel and the helix formed thereon. The feeding and advancing of the helix step by step (winding by winding) is accomplished as follows:

A newly formed winding is engaged by the leading tooth of the toothed member M–1, the previously formed helix being then located in the teeth of the toothed member M–1 as depicted in FIG. 10 of the drawings; the formed helix with the new winding is then advanced the relative distance of a tooth pitch by the relative longitudinal (horizontal) movement of the toothed member M–1 to the sequential positions shown in FIGS. 11 and 12 of the drawings; the formed helix when the teeth $t'$ and $t^2$ are in registry is transferred from the toothed member M–1 to the toothed member M–2 (by the relative downward vertical or transverse movement of these members with reference to the mandrel $m$) to the sequential positions shown in FIGS. 12 and 13 of the drawings; the toothed member M–1 is returned longitudinally from the FIG. 12 position to the positions shown sequentially in FIGS. 13 and 10 of the drawings for the reception of a new winding; the helix when the teeth $t'$ and $t^2$ are again in registry is returned from the toothed member M–2 back to the toothed member M–1 (by the return upward or vertical component of the movement of these members) as will be seen from the sequential views of FIGS. 13 and 10 of the drawings. To accomplish these movements with rapidity, the toothed member M–1 is preferably moved in a circular orbit and the toothed member M–2 is moved in an elliptical orbit, the longitudinal differential between said orbits being equal to the pitch of the teeth of said toothed members. Thus, the said toothed members in moving in their orbits are active for the first toothed member in a horizontal component of its movement for receiving successive windings of the helix from the mandrel and advancing the same the space of a tooth pitch relatively to the second toothed member, both toothed members in the vertical components of their movements causing the transfer of said helix alternately from the first to the second toothed members and then back from the second to the first toothed members.

As will further appear hereinafter, an extended helix is formed in the manner just described, the pitch of the windings being determined by the pitch of the teeth $t'$ and $t^2$. In its advance or transit through the toothed members, pressure is applied to the individual windings to form the heads of the fastener elements (FIGS. 7 and 8), and heat is applied to the formed helix to set the same into its final form.

Figure 14:
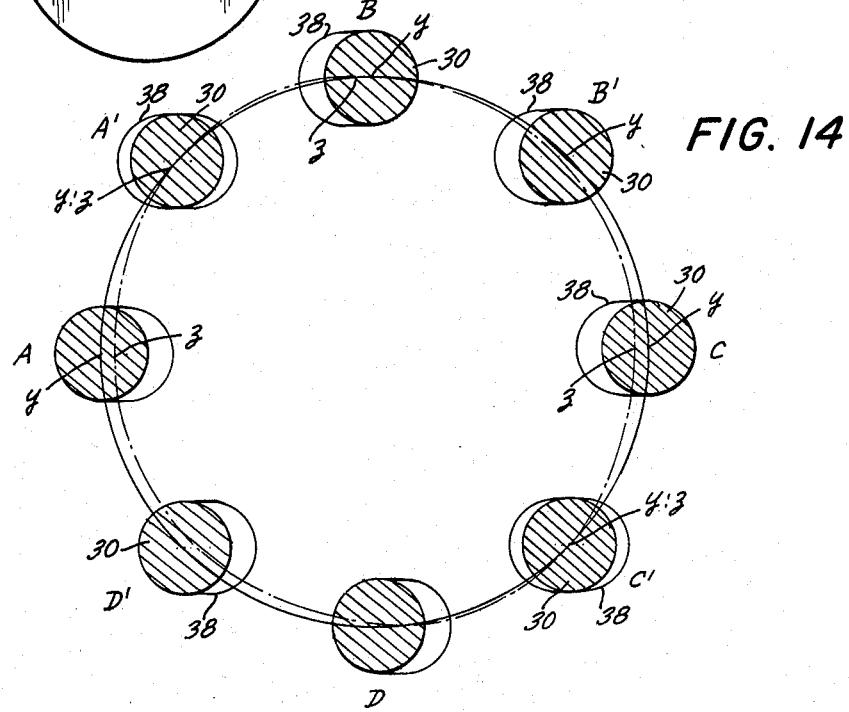
FIG. 14 is an explanatory view of the sequence of operation of certain of the parts shown in FIGS. 10 to 13.

The operated or driven parts of the apparatus for actuating the toothed members M–1 and M–2 in the carrying out the steps of this method are also best depicted in FIGS. 10 to 13, taken together with the explanatory diagram of FIG. 14 of the drawings. The toothed member M–1 is affixed by screws 20 to a carrier plate 22 and the toothed member M–2 is affixed by screws 24 to a second carrier plate 26. A driven rotor member 28 is formed at its end with an eccentric shaft 30. Into a circular aperture 32 in the carrier plate 22 is fitted a circular bushing 34; and the eccentric shaft 30 is fitted into this bushing with needle bearings 36 interposed therebetween (see for this FIG. 4). Into an aperture in the other carrier plate 26 is fitted an elliptical bushing 38; and the eccentric shaft 30, the diameter of which fits the minor axis of the elliptical bushing 38, extends through this bushing. The center of the rotor member 28 is represented by the axis $x$; the center of the eccentric shaft is represented by the axis $y$;

and the center of the elliptical bushing 38 is represented by the axis z (see particularly FIG. 14). As will be described hereinafter, the carrier plates 22 and 26 are supported and operated by two spaced synchronously operated driven mechanisms, each embodying the structure depicted in FIGS. 10 to 13.

With this described and indicated construction, it will be seen that the toothed members M–1 and M–2 are driven in unison in the manner indicated by the arrows in FIGS. 10 to 13, a circular orbit being imparted to the carrier plate 22 and its toothed member M–1, and an elliptical orbit (with its major axis in a vertical direction) being imparted to the carrier plate 26 and its toothed member M–2, by the rotation of the rotor member 28, the differential between these orbits being equal to the pitch of a tooth of said members. From the rotor diagrams 40, 40 accompanying FIGS. 10 to 13, it will be seen that in the rotation of rotor member 28, the eccentric shaft 30 moves in a circular path, and in so doing it will impart a circular orbit to the toothed member M–1. From the diagrammatic development depicted in FIG. 14, it will be seen that in the rotation of the shaft 30 and its movement in the elliptical bushing 38, an elliptical orbit will be imparted to the carrier 26 and its toothed member M–2. The relative movements and positions of the eccentric shaft 30 and the elliptical bushing 38 for a complete cycle are indicated in FIG. 14 in eight sequential positions designated A to D', y representing the center or axis of the shaft 30 and z representing the center or axis of the bushing 38. It may be noted that with reference to these indicated positions, the apparatus depicted in FIGS. 10 to 13 are shown in the following positions: in FIG. 10, the parts are in a position between A and A'; in FIG. 11 in the position A'; in FIG. 12 in a position between C and C'; and in FIG. 13 in the position C'.

The mechanism for winding the mono-filament f about the mandrel m may in its most simplified form comprise a rotatable member 42, orificed centrally to support an end of the mandrel m, and orificed eccentrically at 44 to receive the filament f threaded therethrough, the filament also being threaded through a winding arm 46 affixed to the member 42. Upon rotation of the member 42, the filament f is wound about the mandrel m by the winding arm 46 as indicated in the sequential views of FIGS. 10 to 13. The mandrel leads into and is located in front of the toothed members as is shown in these FIGS. 10 to 13 (see also FIGS. 7 and 8). The filament is fed or advanced through the member 42 by the pull of the feeding action of the toothed members.

Figure 2:
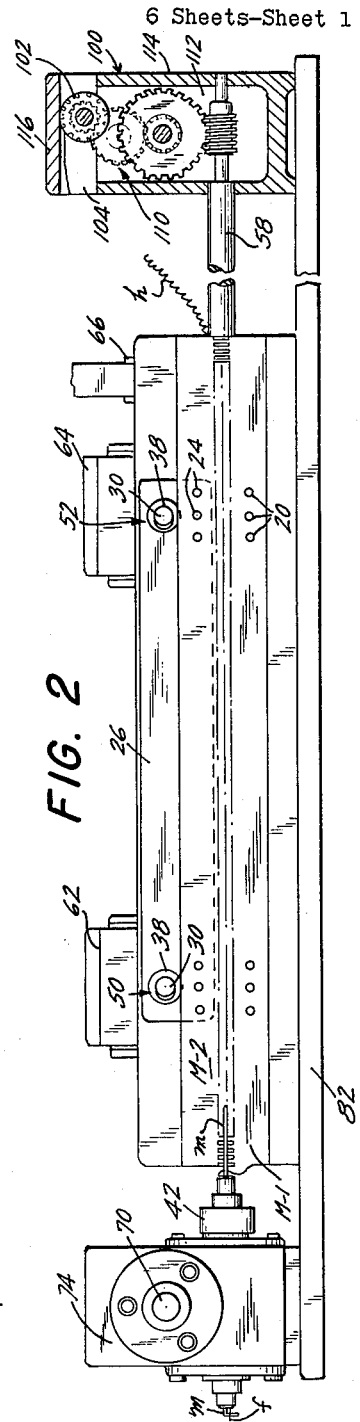
FIG. 2 is a side elevational view thereof with the front cover removed from the midsection of the apparatus and with other parts shown in cross-section.

The organized apparatus is shown in FIGS. 1 to 6 of the drawings. As heretofore pointed out, the carrier plates 22 and 26 are supported and operated by two spaced synchronously operated driven mechanisms, each embodying the structure depicted in FIGS. 10 to 13 of the drawings. This is best shown in FIGS. 1 and 2 of the drawings wherein the spaced driven mechanisms are generally designated as 50 and 52. In the preferred embodiment of the apparatus two helixes are continuously produced, one for the right and the other for the left side of the slide fastener, which helixes are pulled-up and intermeshed in the machine to produce the complete slide fastener elements. For this purpose the apparatus for producing a helix is duplicated, the mechanism for producing one side of the slide fastener generally designated as 54 being located on one side of the machine and the corresponding mechanism generally designated as 56 for producing the other side of the slide fastener being located on the opposite side of the machine. Since both of these mechanisms are duplicate in character, a description of only one of them will suffice.

The main drive shaft 58 of the machine is supported in the spaced standards in the shape of the gear casings 60, 62 and 64 and receives power from the driven pulley 66 keyed to the main shaft. The main shaft 58 is connected to drive the rotatable members 42 by means of the worm gears 68 connecting the main shaft 58 to the transverse shaft 70, which latter in turn connects by means of the worm gears 72 to the rotatable members 42, as best shown in FIGS. 3 and 5 of the drawings. The transverse shaft 70 and the rotatable members 42 are supported in standards in the form of the gear casings 74 and 76. The main shaft 58 is also connected to drive the four spaced rotor members 28, each set of the spaced rotor members 28 being keyed to a transverse shaft 78 connected to the main shaft 58 by means of the worm gearing 80. All of the shafts as well as the rotatable members 42 are mounted in the referred to gear casings by suitable ball bearings as shown; and all of the gear casings are anchored to a base plate 82 as clearly shown in the drawings. The driven parts of the apparatus are protectively enclosed by rear and front plates 84 and 86 (see FIG. 4) also suitably anchored to the base plate 82.

In the illustrated embodiment of the machine the toothed members M–1 and M–2 extend for the full length indicated in FIG. 2 of the drawings and are made of a length of about sixteen inches; the mandrel m extends into the toothed members a distance of about eight to ten teeth. However, it has been found that the length of the toothed members may be varied and may be shortened to as little as four inches; and it has been found that the mandrel may be made to extend the full length of the toothed members in whatever length may be selected for the latter.

Means are provided for heating the helix in its transit by and through the toothed members to set the same. For this purpose an elecrical heating unit 88 is affixed to each side of the machine, inserted between the carrier plates 22, 22 and in sufficient proximity to the toothed members M–1 and M–2 to supply the heat necessary to set the helix in the shape formed by the apparatus. The carrier plates 22, 22 on each side of the machine are interconnected for movement in unison by means of a longitudinal bar 90 (see particularly FIGS. 10 to 13).

Figure 7:
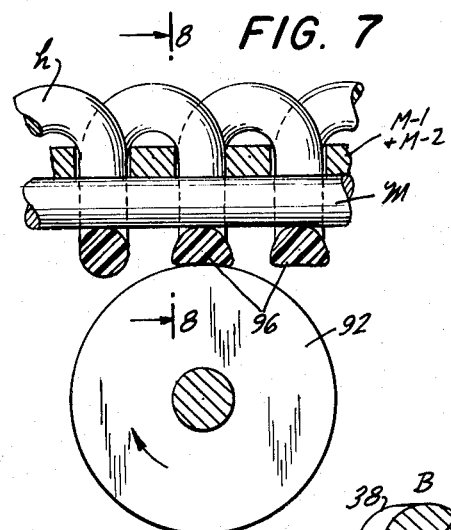
FIG. 7 is an enlarged view depicting one manner of forming the heads on the helical elements of the slide fastener formed in the machine.
Figure 8:
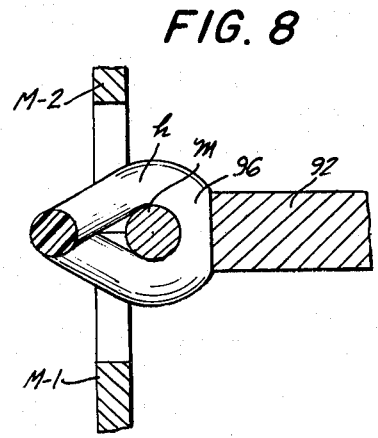
FIG. 8 is a view taken in cross-section in the plane of the line 8—8 of FIG. 7.
Figure 9:
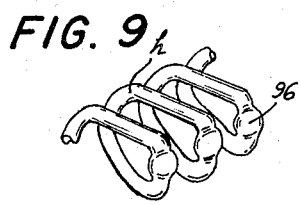
FIG. 9 is a perspective view of a typical portion of the helical slide fastener formed by the method and machine of the present invention.

For forming the interengageable fastener heads of the fastener element, correspondingly spaced portions of the filament f are subjected to pressure at a desired point in the operation of the machine. This is preferably accomplished by means for pressing the individual windings of the helix against the mandrel m. This may be accomplished by providing a pressure roll 92 suitably mounted in a holder 94 and arranged to be rotated by engagement with the windings of the helix h, the pressure of engagement being sufficient to compress the engaged part of the winding to form the desired head. This action is best shown in FIGS. 7 and 8 of the drawings wherein the pressure roll 92 rotating in the direction indicated by the arrow in FIG. 7, engages the front portions of the helix windings and presses the same to form the heads 96, the pressure being against the mandrel m. As a result of the combined operations a plastic filament helix or coil as depicted in FIG. 9 is produced.

The left and right side helixes exiting from the machine are preferably then pulled-up and intermeshed to form a completed two sided plastic fastener element. This is accomplished by the pull-up mechanism generally designated as 100 located at the end of the machine. This mechanism, best shown in FIGS. 6 and 15 of the drawings, comprises a driven double toothed element 102, the teeth of which are spaced to engage the windings of the helixes and are also differentially spaced to effect the intermeshing or interengagement of the heads of the helixes, the latter being guided toward and into the toothed element 102 by means of the guideway 104. The toothed element 102 is keyed to a shaft 106 which receives motion from a shaft 108 by way of the spur gearing 110, the shaft 108 in turn receiving motion from the main shaft 58 by way of the worm gears 112. This described mechanism is mounted in a gear casing 114 anchored as shown to the base plate 82, the casing being desirably provided at its top with a latch releasable closure 116.

In FIG. 16 of the drawings there is shown a modification of the mechanism for forming the heads of the helix. A cam 118 is keyed to the rotatable member 42' and actuates a cam follower arm 120 pivoted at 122 on a machine part. The cam follower actuates a spring loaded striking plunger 124 once for every cycle of rotation of the rotatable member 42'. The plunger when thus actuated strikes a filament winding of the helix $h$ supported by the mandrel $m$. The cam 118 is positioned to permit instantaneous motion of the head striking plunger 124 at a time when the lower toothed member M-1 is being moved longitudinally and the upper toothed member M-2 is in a relatively dwell condition.

The practice of the method of the present invention and the operation of the machine therefor for making plastic slide fastener elements will it is believed be fully apparent from the above detailed description thereof. Two helical slide fastener elements with the windings thereof headed and spaced a predetermined amount are continuously and rapidly formed into final shape; and the two helixes thus formed are intermeshed to produce a continuous two-sided slide fastener element. This slide fastener element, with its two intermeshed side sections, is produced in a condition to be directly sewed onto two tapes to form the completed two-sided continuous stringer.

It will also be apparent that many changes may be made in the steps of the method and in the structure of the apparatus without departing from the spirit of the invention as defined in the following claims.

We claim:

1. The method of making a slide fastener which comprises winding a filament about a mandrel to form a helix, engaging the individual windings of the formed helix between the successive teeth of two oppositely facing toothed members, the teeth of said members being spaced to define the pitch of the helix windings, and advancing the helix by transferring the helix windings in succession alternatingly from one toothed member to the other and by longitudinally moving one of the toothed members relatively to the other the distance of the pitch of a winding.

2. The method of claim 1 in which the filament is a plastic filament and in which correspondingly spaced portions of the filament are subjected to pressure to form fastener heads on the windings.

3. The method of making a plastic slide fastener which comprises winding a thermoplastic filament about a mandrel to form a helix, engaging the individual windings of the helix between the successive teeth of two oppositely facing toothed members, the teeth of said members being spaced to define the pitch of the helix windings, advancing the helix by transferring the helix windings in succession alternatingly from one toothed member to the other and by longitudinally moving one of the toothed members relatively to the other the distance of the pitch of a winding, and heating the thus formed helix to set the same.

4. The method of claim 3 in which the individual windings of the helix are pressed against the mandrel to form fastener heads on said windings.

5. The method of making a plastic slide fastener comprising winding a plastic filament about a mandrel to form a helix, moving two toothed members in unison relatively to said mandrel and the helix formed thereon, the teeth of said toothed members being spaced to define the pitch of the helix windings, moving the first of said toothed members in a circular orbit and moving the second of said toothed members in an elliptical orbit, the differential between said orbits being equal to the pitch of the teeth on said members, the said toothed members in moving in their orbits being active for the first toothed member in the horizontal component of its movement receiving successive windings of the helix from said mandrel and advancing the same the space of a pitch tooth relatively the second toothed member and both toothed members in the vertical component of their movements causing the transfer of said helix alternatingly from the first to the second toothed members and then back from the second to the first of the toothed members.

6. The method of claim 5 in which the filament is a thermoplastic filament and in which the individual windings are pressed to form fastener heads and the helixes are heated as they are advanced to set the same.

7. An apparatus for making a slide fastener comprising a mandrel, two oppositely facing movable toothed members, said mandrel being arranged to lead into said toothed members, means for winding a filament about the mandrel to form a helix, and means for moving said toothed members in unison relatively to said helix and for moving a first of said toothed members longitudinally relatively to the second of said toothed members, the first of said toothed members in said movement receiving successive windings of said formed helix, advancing the same the space of a tooth and then transferring the same to the second of said toothed members, the teeth of said toothed members being spaced to define the pitch of the helix windings, the helix in said movement being returned to the first toothed member when the latter is moved to receive a new winding, whereby the helix formed about said mandrel is uniformly pitched and continuously advanced in the operation of the apparatus.

8. An apparatus for making a plastic slide fastener comprising a mandrel, two oppositely facing movable toothed members, said mandrel being arranged to lead into said toothed members, means for winding a thermoplastic filament about the mandrel to form a helix, means for moving said toothed members in unison relatively to said helix and for moving a first of said toothed members longitudinally relatively to the second of said toothed members, the first of said toothed members in said movement receiving successive windings of said formed helix, advancing the same the space of a tooth and then transferring the same to the second of said toothed members, the teeth of said toothed members being spaced to define the pitch of the helix windings, the helix in said movement being returned to the first toothed member when it is moved to receive a new winding, whereby the helix formed about said mandrel is uniformly pitched and continuously advanced in the operation of the apparatus, and means for heating the thus formed and pitched helix to set the same.

9. In combination with the apparatus of claim 8, means for pressing spaced portions of the filament to form the fastener heads on the windings.

10. The apparatus of claim 9, in which said pressing means is arranged to press a helix winding against the mandrel.

11. An apparatus for making a plastic slide fastener comprising a mandrel, two oppositely facing movable toothed members, said mandrel being arranged to lead into said toothed members, means for winding a plastic filament about the mandrel to form a helix, means for moving said toothed members in unison relatively to said mandrel and the helix formed thereon, said means comprising mechanism for moving the first of said toothed members in a circular orbit and mechanism for moving the second of said toothed members in an elliptical orbit, the differential between said orbits being equal to the pitch of the teeth on said members, the teeth of said toothed members being spaced to define the pitch of the helix windings, the said toothed members in moving in their orbits being active for the first toothed member in the horizontal component of its movement receiving successive windings of the helix from said mandrel and advancing the same the space of a pitch tooth relatively the second toothed member and both toothed members in the vertical component of their movements causing the transfer of said helix from the first to the second toothed members and then back from the second to the first of the toothed members.

12. In combination with the apparatus of claim 11, means for heating the formed and pitched helix to set the same and means for pressing spaced portions of the windings to form fastener heads on the windings.

13. An apparatus for making a slide fastener comprising two oppositely facing movable toothed members, the teeth of said toothed members being spaced to define the pitch of the helix windings to be formed, a mandrel leading into said toothed members, means for winding a filament about the mandrel to form a helix, and means for advancing the helix comprising means for moving one of the toothed members longitudinally with reference to the other and said mandrel for receiving successive windings of the helix from the mandrel and advancing the helix the space of a tooth pitch and means for moving said toothed members in unison transversely relatively to said mandrel for transferring the helix windings in succession from one toothed member to the other.

14. An apparatus for making a slide fastener comprising two oppositely facing movable toothed members, the teeth of said toothed members being spaced to define the pitch of the helix windings to be formed, a mandrel leading into said toothed members, means for winding a filament about the mandrel to form a helix, and means for advancing the helix comprising means for moving one of the toothed members longitudinally with reference to the other and said mandrel for receiving successive windings of the helix from the mandrel and advancing the helix the space of a tooth pitch, and means for moving said toothed members in unison transversely relatively to said mandrel for transferring the helix windings in succession from one toothed member to the other, and means for heating the thus formed and pitched helix to set the same.

15. In combination with the apparatus of claim 14, means for pressing spaced portions of the filament to form the fastener heads on the windings.

16. The apparatus of claim 15, in which said pressing means is arranged to press a helix winding against the mandrel.

References Cited in the file of this patent

UNITED STATES PATENTS

| | | |
|---|---|---|
| 2,388,401 | Freundlich | Nov. 6, 1945 |
| 2,973,554 | Hansen | Mar. 7, 1961 |
| 2,974,372 | Yoshida | Mar. 14, 1961 |
| 2,980,959 | Genovese | Apr. 25, 1961 |

FOREIGN PATENTS

| | | |
|---|---|---|
| 533,991 | Canada | Dec. 4, 1956 |